United States Patent
Aridor et al.

(10) Patent No.: US 7,958,509 B2
(45) Date of Patent: Jun. 7, 2011

(54) METHOD AND SYSTEM FOR SCHEDULING OF JOBS

(75) Inventors: Yariv Aridor, Zichron-Yaakov (IL); Richard Edwin Harper, Chapel Hill, NC (US); Elad Yom-Tov, Hoshaya (IL)

(73) Assignee: International Business Machines Corporation, Armonk, NY (US)

( * ) Notice: Subject to any disclaimer, the term of this patent is extended or adjusted under 35 U.S.C. 154(b) by 1540 days.

(21) Appl. No.: 11/313,395

(22) Filed: Dec. 21, 2005

(65) Prior Publication Data

US 2007/0143765 A1 Jun. 21, 2007

(51) Int. Cl.
G06F 15/173 (2006.01)
G06F 9/46 (2006.01)

(52) U.S. Cl. ......... 718/104; 718/100; 718/101; 709/226

(58) Field of Classification Search .................. None
See application file for complete search history.

(56) References Cited

U.S. PATENT DOCUMENTS

| | | | |
|---|---|---|---|
| 4,890,227 A | 12/1989 | Watanabe et al. | |
| 5,442,730 A | 8/1995 | Bigus | |
| 5,745,652 A * | 4/1998 | Bigus | 706/14 |
| 6,618,820 B1 * | 9/2003 | Krum | 714/13 |
| 6,785,889 B1 * | 8/2004 | Williams | 718/104 |
| 6,865,529 B2 * | 3/2005 | Brandel et al. | 704/207 |
| 6,889,243 B1 * | 5/2005 | Hondou et al. | 718/100 |
| 7,441,244 B2 * | 10/2008 | Longobardi | 718/104 |
| 7,472,373 B2 * | 12/2008 | McKethan | 717/101 |
| 7,526,521 B2 * | 4/2009 | Clark et al. | 709/203 |
| 7,665,090 B1 * | 2/2010 | Tormasov et al. | 718/104 |
| 7,831,325 B1 * | 11/2010 | Zhang et al. | 700/108 |
| 2002/0194247 A1 | 12/2002 | Caggese et al. | |
| 2003/0033346 A1 * | 2/2003 | Carlson et al. | 709/104 |
| 2005/0055694 A1 * | 3/2005 | Lee | 718/100 |
| 2005/0071107 A1 | 3/2005 | Betzler et al. | |
| 2005/0081208 A1 * | 4/2005 | Gargya et al. | 718/100 |
| 2005/0091654 A1 | 4/2005 | Lection et al. | |
| 2005/0198636 A1 * | 9/2005 | Barsness et al. | 718/100 |
| 2006/0271544 A1 * | 11/2006 | Devarakonda et al. | 707/9 |
| 2007/0078960 A1 * | 4/2007 | Dawson et al. | 709/223 |

FOREIGN PATENT DOCUMENTS

EP 0647903 4/1995

(Continued)

OTHER PUBLICATIONS

Ali et al., Predicting the Resource Requirments of a Job Submission, 2004, Computing in High Energy and Nuclear Physics (CHEP 2004).*

(Continued)

*Primary Examiner* — Meng-Ai An
*Assistant Examiner* — Abdullah Al Kawsar

(57) ABSTRACT

A method and system of resource allocation for execution of a job are provided. The method includes receiving feedback (134) regarding the execution of previously submitted jobs on one or more resource nodes (101-104), and estimating the resources required for execution of a submitted job based on the feedback (134) and the parameters of the job. One, or a plurality of resource nodes in parallel, having the estimated resources are allocated the job. The feedback may be implicit feedback indicating the success or failure of the execution of a job. The one or more resource nodes (101-104) allocated for execution of a job may have less than a user requested resource allocation for the job.

15 Claims, 7 Drawing Sheets

FOREIGN PATENT DOCUMENTS

| WO | WO2005089236 | 9/2005 |
|---|---|---|
| WO | WO2005091129 | 9/2005 |

OTHER PUBLICATIONS

Nieh et al., A SMART Scheduler for Multimedia APplications, May 2003, pp. 117-163.*

D. Tsafrir, Y. Etsion, and D. G. Feitelson. "Backfilling using runtime predictions rather than user estimates". Technical Report TR 2005-5, School of Computer Science and Engineering, Hebrew University of Jerusalem, 2003.

V. Naik, C. Liu, L. Yang, and J. Wagner. "On-line resource matching in a heterogeneous grid environment". In IEEE International Symposium on Cluster Computing and the Grid (CCGrid 2005). IEEE, 2005.

K. Pramod Kumar et al., "Fuzzy Based Resource Management Framework for High Throughput Computing", 2004, IEEE International Symposium on Cluster Computing and the Grid.

Rajesh Raman, Miron Livny, Marvin Solomon, "Resource Management through Multilateral Matchmaking," HPDC, p. 290, Ninth IEEE International Symposium on High Performance Distributed Computing (HPDC-9 '00), 2000.

* cited by examiner

METHOD AND SYSTEM FOR SCHEDULING OF JOBS

FIELD OF THE INVENTION

This invention relates to the field of scheduling of jobs. In particular, the invention relates to scheduling of jobs to be executed on heterogeneous resource nodes.

BACKGROUND OF THE INVENTION

Computing environments may use a cluster of remote resource nodes to execute jobs. The resource nodes are usually computer processors, or full computing elements. Clusters may be deployed to improve speed and/or reliability over a single computer.

Grid computing is a form of cluster computing which uses the resources of many separate computers connected by a network. Grid computing allows the execution of distributed algorithms on a cluster of heterogeneous machines. These machines usually have very different computing power and resources (memory, networking, etc.). This is both a challenge and an advantage to scheduling algorithms.

Job schedulers provide a means to send jobs for batch execution on remote computers. In this context, a job is defined as a set of processes which should run on a single computer or on multiple computers, in parallel. One of the main challenges of job schedulers is resource allocation. This is the ability to match jobs with the exact resources needed to run the jobs. Resources can vary from hardware requirements (e.g., the number of cluster nodes) or the required memory of each node, to prerequisite software packages.

In general, all known approaches to this problem are either static or dynamic approaches. In the former, there is an a priori mapping between resources and jobs. The latter requires that a job be submitted together with a specification of resources (types, amount) it needs for successful execution e.g., number of machines, amount of memory, predefined software packages. Once a job is submitted, it is added into a job queue. The scheduler fetches jobs from the queue according to a predefined policy (e.g., FIFO, shortest-job-first). Then, it selects resources for the job. This phase is called "resource allocation". If the required resources are found, the job is launched for execution on the selected computer. Otherwise, the job scheduler may try another job from the queue.

Resource allocation becomes even more challenging for grid infrastructure where the clusters are composed of heterogeneous resources which may join and leave these cluster dynamically. Naturally, static approaches do not fit with these grid infrastructures and dynamic approaches are not well optimized for heterogeneous platforms. The main problem stems from the fact that user often over estimates the job requirements. As a result of over-estimation, jobs may occupy extra resources while blocking other jobs which could otherwise used these resources.

Consider the following scenario: Assume two machines M1 and M2 and two jobs J1 and J2. Assume M1 has larger memory size than M2. Initially, J1 can run on either M1 or M2. However, the resource allocation matches it with machine M1 since the user requested a memory size larger than that of M2, but which is possible for M1. Later J2 arrives. Due to its memory size request, the only machine it can use is M1. Now J2 is blocked until J1 completes or a new node with at least the same memory size as M1 is added to the cluster.

SUMMARY OF THE INVENTION

A method and system for resource allocation are provided based on actual runtime requirements rather than user requests. The method matches optimal resources in heterogeneous computing clusters through automatic learning of each jobs' runtime requirements.

According to a first aspect of the present invention there is provided a method of resource allocation for execution of a job, comprising: receiving feedback regarding the execution of previously submitted jobs on one or more resource nodes; receiving a request for a job including parameters of the job; estimating the resources required for execution of the job based on the feedback and the parameters of the job; and allocating the job to one or more resource nodes having the estimated resources.

According to a second aspect of the present invention there is provided a computer program product comprising a computer useable medium including a computer readable program, wherein the computer readable program when executed on a computer causes the computer to carry out the steps of: receiving feedback regarding the execution of previously submitted jobs on one or more resource nodes; receiving a request for a job including parameters of the job; estimating the resources required for execution of the job based on the feedback and the parameters of the job; and allocating the job to one or more resource nodes having the estimated resources.

According to a third aspect of the present invention there is provided a system for resource allocation for execution of a job, comprising: a feedback module for receiving feedback regarding the execution of previously submitted jobs on one or more resource nodes; an estimator for estimating the resources required for execution of a job based on the feedback and the parameters of a job; and a resource allocator for allocating a job to one or more resource nodes having the estimated resources.

According to a fourth aspect of the present invention there is provided a method of providing a service to a customer over a network, the service comprising: receiving feedback regarding the execution of previously submitted jobs on one or more resource nodes; receiving a request for a job including parameters of the job; estimating the resources required for execution of the job based on the feedback and the parameters of the job; and allocating the job to one or more resource nodes having the estimated resources.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessar-

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
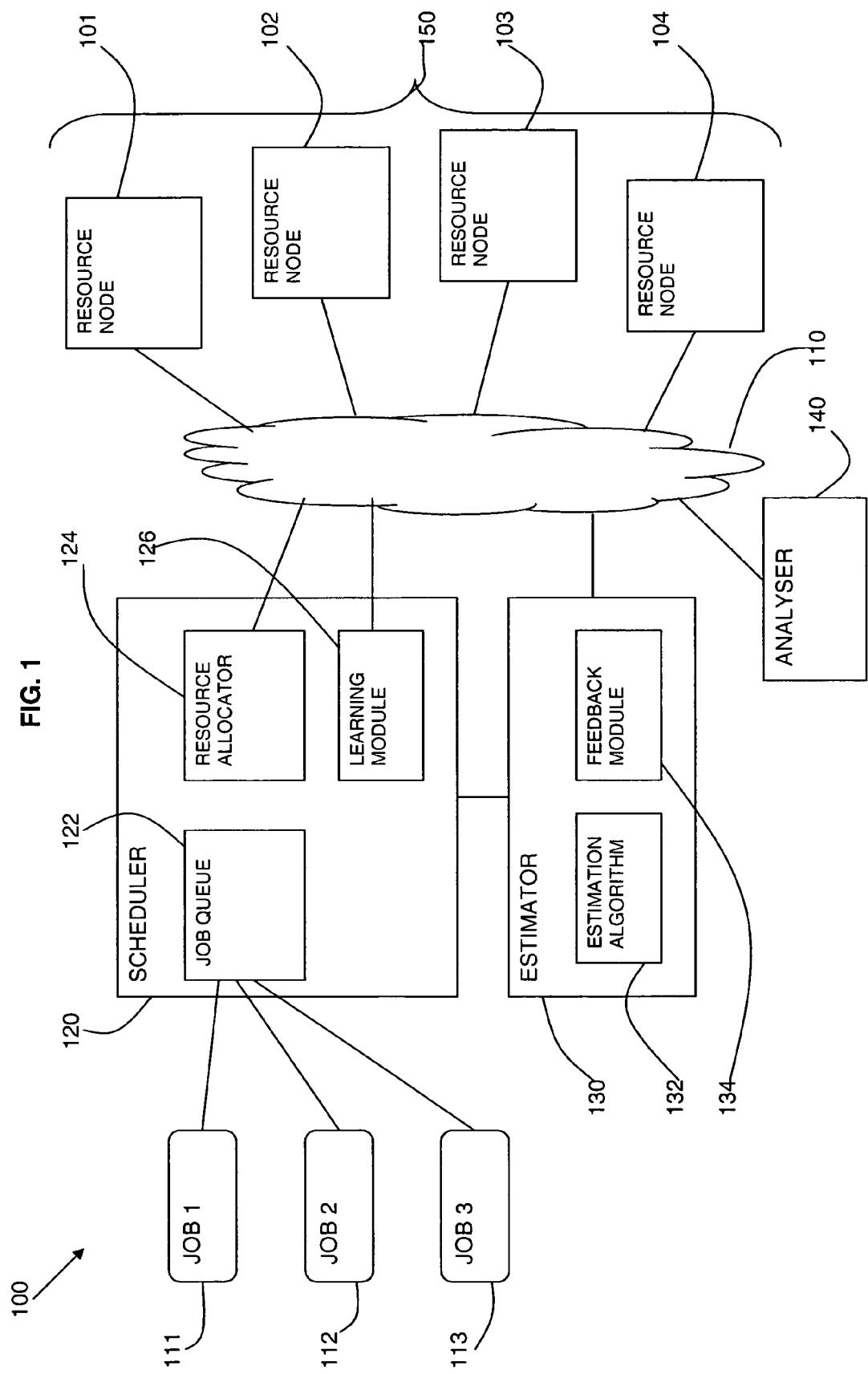
FIG. 1 is a block diagram of a computer system in accordance with the present invention.

Referring to FIG. 1, a distributed computing system 100 is shown. A plurality of resource nodes 101, 102, 103, 104 are provided which are coupled together to form a group 150. The resources nodes 101-104 may be computers and the resources may be processor capacity, disk storage, or other forms of hardware and/or software resources. The resource nodes 101-104 may be coupled by means of a network 110, for example, a local area network (LAN), or the Internet. In one embodiment, the group 150 of resources nodes 101-104 may be a computer cluster. In another embodiment, the resources 101-104 may form a computing gird. The resources nodes 101-104 may be heterogeneous such that the resource nodes have different capacities, for example, memory size or processing power.

A job scheduler 120 is provided which sends jobs for batch execution on the remote resource nodes 101-104. A plurality of jobs 111, 112, 113 are illustrated schematically as inputs to the job scheduler 120. A job 111-113 is defined as a set of processes which should be run on a single resource node or on multiple resource nodes in parallel. A job 111-113 is submitted together with a specification of resources required (type and amount) for successful execution. For example, a specification may include the number of computer processors required, the amount of memory, predefined software packages, etc.

A job 111-113 is submitted to the job scheduler 120 and is added to a job queue 122. The scheduler 120 fetches jobs from the queue 122 according to a predefined policy (for example, FIFO (first in, first out), shortest job first, backfilling, etc.). The scheduler 120 includes a resource allocator 124 which selects one or more resource nodes 101-104 to carry out a job 111-113. If one or more resource nodes 101-104 is selected for a job 111-113, the job 111-113 is launched for execution by the selected resource nodes 101-104. Otherwise, the job 111-113 remains on the queue 122 and another job is selected from the queue 122. The outcome of the job 111-113 is reported to a learning module 126 of the scheduler 120.

An estimator 130 is provided which estimates job requirements. The estimator 130 assists the job scheduler 120 to match jobs 111-113 to resource nodes 101-104 with lower available resources than those requested in the specification of the job 111-113. The estimator 130 may be integral with the scheduler 120 or may be coupled to it, directly or via a network. The estimator 130 learns from the outcome of previously executed jobs.

The estimator 130 includes an estimation algorithm 132 which uses feedback from the resource nodes 101-104 regarding previously executed jobs and the current user requests. The feedback is received at a feedback module 134 in the estimator 130.

The operation of the estimator 130 is independent of the scheduler policy (i.e., FIFO, shortest-first-job, backfilling) and can be applied whatever this policy may be.

Analysis tools 140 are provided which collect resource information from the resource nodes 101-104. The analysis tools 140 may run on the resource nodes 101-104 being analyzed or, alternatively, may run remotely via the network 110. The data collected includes hardware configuration, software installed, as well as system logs, etc. The tools 140 may run periodically and the information is sent to the estimator 130 and to resource allocator 124. An example, of an analysis tool 140 is IBM's Dynamic System Analysis (DSA) (trade marks of International Business Machines Corporation).

Figure 2:
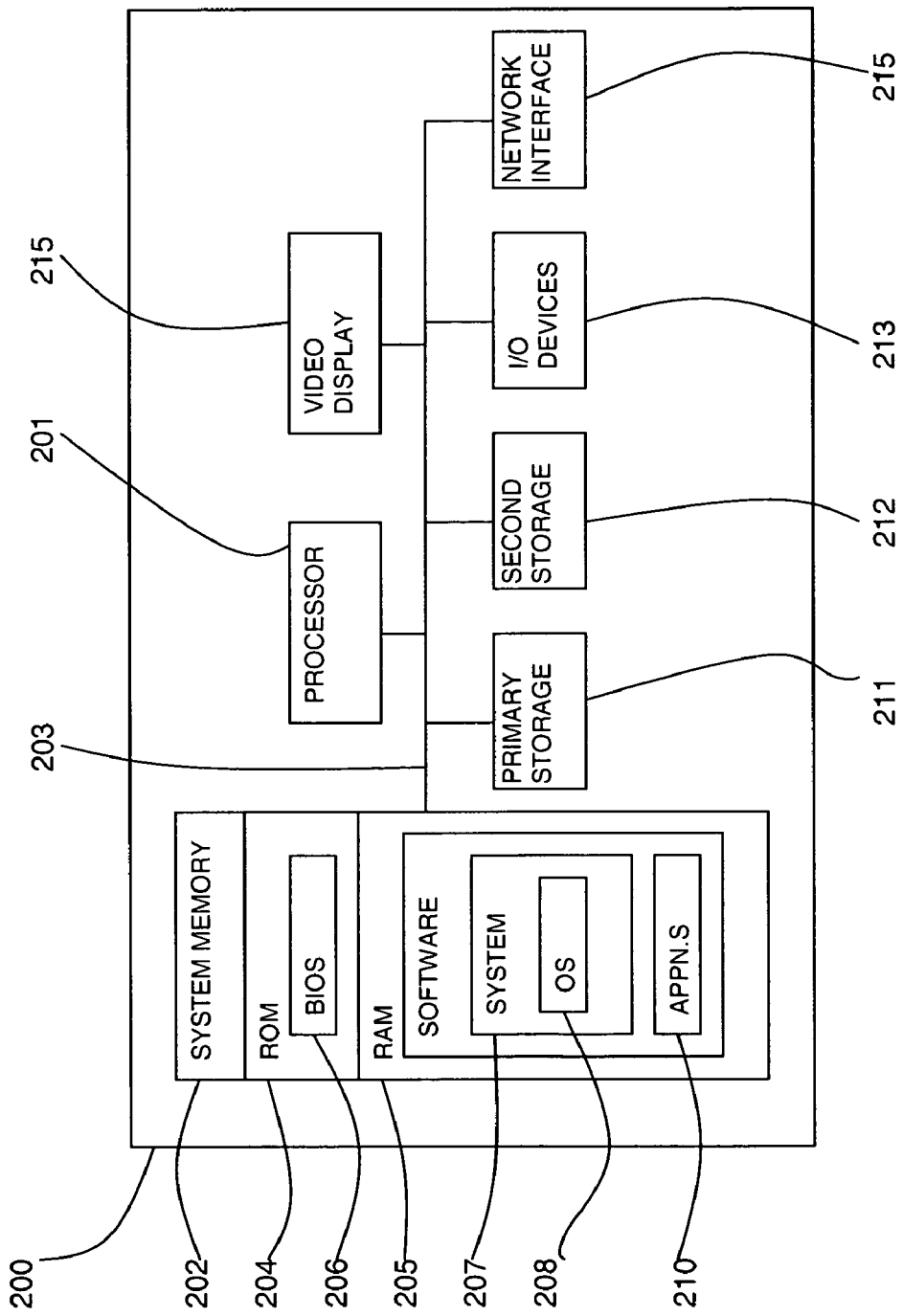
FIG. 2 is a block diagram of a computer system in which the present invention may be implemented.

Referring to FIG. 2, an exemplary system for implementing the job scheduler 120 and/or the estimator 130 is provided in the form of a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device may also be connected to system bus 203 via an interface, such as video adapter 215.

The described system is mainly useful where the resource nodes 101-104 are in the form of a heterogeneous cluster environment in which high-utilization (i.e. average percentage of computers that are busy at any point in time) or slow-down (i.e. average ratio between execution time and the time interval between submission to completion, per job), or any other measurement derived from them, are primary goals. It is assumed that the same jobs may be repeated for execution more than once. However, job pre-emption is not assumed and jobs can run on more than one machine.

There are two main ingredients for the estimator 130. Firstly, the ability to collect comprehensive resource information from the resources 101-104, for example, using an analysis tool 140. Secondly, the ability to automatically match resource nodes with the actual needs of jobs. This is done through a learning phase.

The learning phase has three options, as follows:

One option is to assume jobs are repeated so the system can learn their actual needs by observing previous applications of the job.

Another option is to learn a similarity function such that jobs with similar input parameters (submitting users, requested resources, etc) require similar actual resources. For example, it might be possible to group jobs by their users (submitters) and the actual needs of these users are learnt as if these are the actual needs of each individual job.

Another option, usually if either of the previous options are not available is to match the requested resources of a job and the available resources.

The scheduler 120 is always notified of a job completion, and a learning module 126 in the scheduler 120 is updated with indications for the success or failure of the job execution so that better matching is made in the future. These indications can be either if the job successfully executed or not, or else the actual resources that the job consumed. For example, if one of the requirements is a software license, the system learns that such a requirement is mandatory since every job submitted to a machine without such license will fail to execute. This learning is done automatically, based on past experience. Upon unsuccessful completion of the job, it is returned back to the job queue 122 and resubmitted automatically. Side effects of unsuccessful runs are addressed by the scheduler 120, based on the specific side-effects which occur.

Figure 3A:
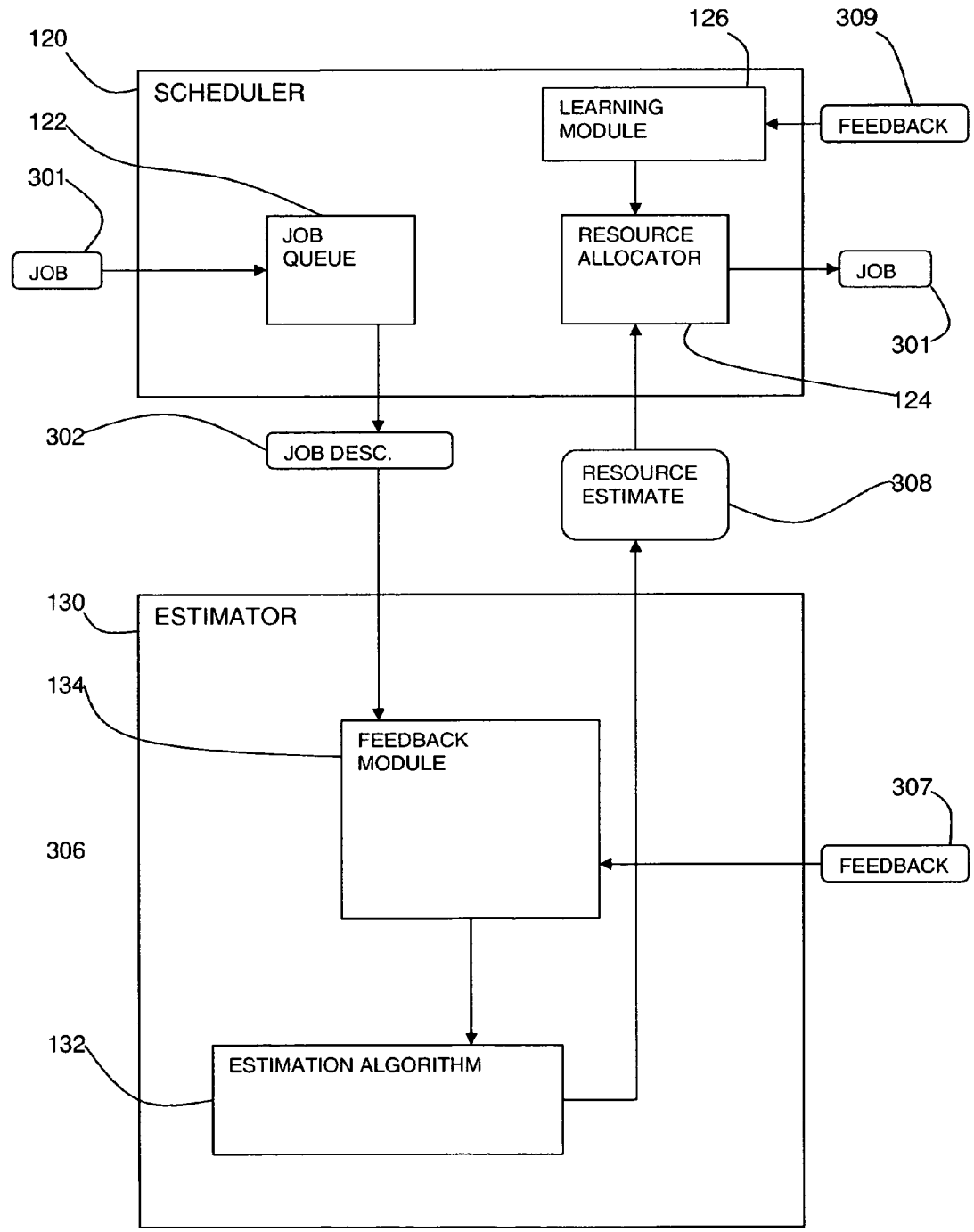
FIGS. 3A and 3B are block diagrams of two embodiments of a job scheduler and an estimator in accordance with the present invention.
Figure 3B:
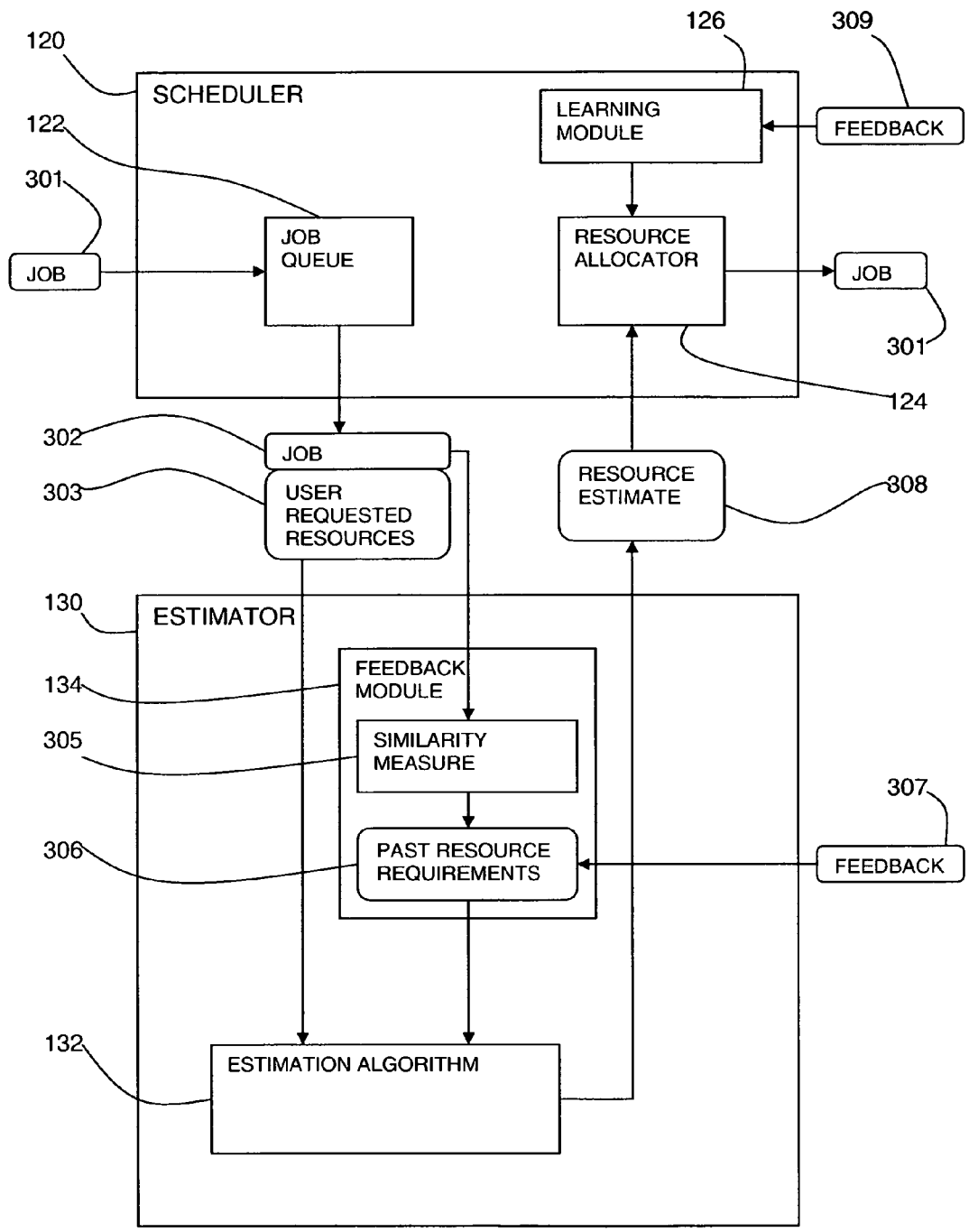

Referring to FIGS. 3A and 3B, a more detailed diagram two embodiments of the job scheduler 120 and estimator 130 are shown with inputs and outputs shown in blocks with curved corners. In both embodiments, a job 301 is input to the job queue 122 of the scheduler 120.

In FIG. 3A, the job description 302 including the parameters of the job are input to the feedback module 134 of the estimator. The feedback module 134 in combination with the estimation algorithm 132 uses state information from feedback 307 from the resource nodes together with the parameters of the job to learn the actual required resources of the job.

In FIG. 3B, the job description 302 together with the specification of the user requested resources 303 for the job 301 are provided to the estimator 130. The job description 302 is input to the feedback module 134 of the estimator 130. In this embodiment, in the feedback module 134 the job description 302 is compared by a similarity measure 305 with previously executed jobs. The past resource requirements 306 for similar previously executed jobs are received in feedback 307 from the resource nodes and stored in the feedback module 305. The user requested resources 303 and the past resource requirements 306 of similar previously executed jobs are used as inputs to the estimator algorithm 132.

The output of the estimator algorithm 132 in both embodiments is an estimate of resources 308 needed for the job 301. The estimate of resources 308 is input to the resource allocator 124 of the scheduler 120 which matches the estimate of resources 310 to one or more resource nodes and allocates the job 301.

Feedback 309 in the form of whether or not a job executed successfully is provided to the learning module 126 of the scheduler 120.

Figure 4:
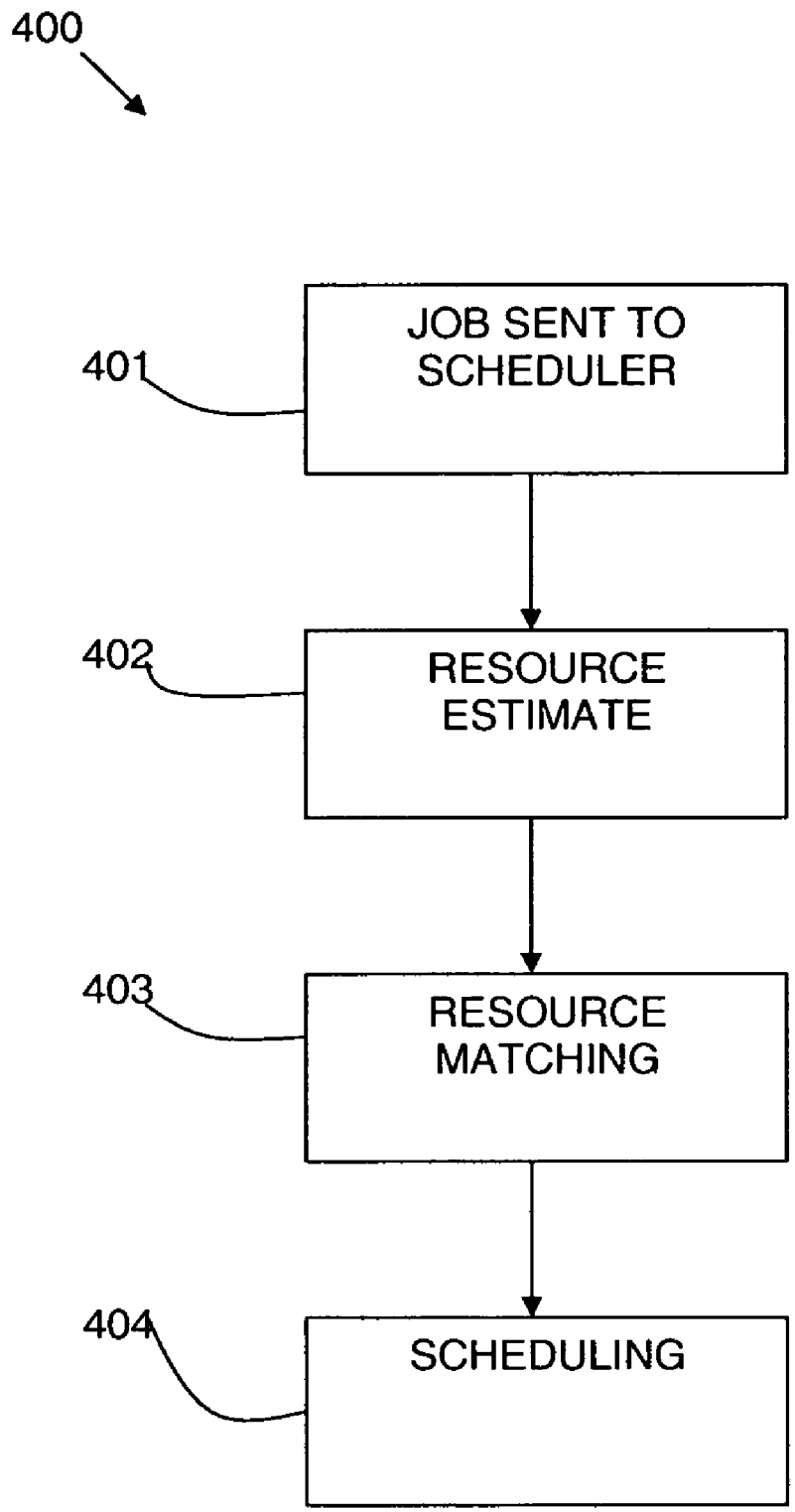
FIG. 4 is a flow diagram of a method in accordance with the present invention.

Referring to FIG. 4, a flow diagram 400 shows the process when a job is submitted to the scheduler 120. A job is submitted 401 to the scheduler. The resource requirements are estimated 402 based on past knowledge and current user requirements. The estimated requirements are then matched 403 to available resources, and these are, in turn, used by the scheduler 404.

The process of estimating job requirements at step 402 of FIG. 4, is dependent upon the information which a particular group 150 of resource nodes 101-104 can provide, as well as on the characteristics of the jobs 111-113 which are submitted to the resources.

Some groups 150 of resource nodes might provide the estimator 130 with the actual resources used by a job when that job has finished running. Such explicit feedback is the most informative type of feedback and can readily be used, for example, for repeated instances of the same jobs. However, some nodes might not report the actual resources used (or might report only partial information, such as only a limited list of resources). In such cases only implicit feedback, namely, whether or not a job was able to run on the group 150, is provided to the resource estimator 130. The selection of the actual estimation algorithm is not necessarily dependent on the type of available feedback. However, explicit feedback is more informative, and so it is expected that when such feedback is available, resource estimation will achieve better performance compared to cases where only implicit feedback is given.

The estimation of actual job requirements of step 403 of FIG. 4, is based on previous experience. In this context, previous experience is the outcome of previous job submissions together with the state information at the time when the jobs were submitted. The estimation algorithm needs to find the most similar instances of previous jobs (if such instances exist) and infer from them the requirements of jobs currently in the queue.

The similarity measure (otherwise known as a distance function) uses the requested resources of the previous jobs to find jobs similar to the current jobs. The main requirement of the similarity measure is to be able to infer, based on the requested resources, the needed resources.

A simple way to measure similarity is through the identification of repeating jobs. If jobs are repeatedly submitted for execution, each time using similar resources, and if a similarity measure can recognize such repeated submissions, the resource estimation could use historic information on the particular job to estimate the actual job requirements.

However, identification of repeating jobs is by no means the only way to measure similarity between jobs.

There are many algorithms suitable for actual resource estimation. Two possible algorithms are described: reinforcement learning and line search. The former is more general, while the latter is more suitable when repeated jobs can be identified.

Estimation of actual job requirements without assuming job repetition is best approached using reinforcement learning. Reinforcement learning is a class of learning algorithms where an agent learns a behaviour policy by exploring a state-space. The agent can take actions for which it receives rewards for good actions or penalties in the case of poor actions. The goal of the agent is to maximize its cumulative reward by modifying its behavior policy.

In reinforcement learning the system status, i.e. the status of each node (idle or busy, and if busy, for how long) and its configuration information (software and hardware installations) as well as the parameters of the jobs in the queue, are used as state information for a reinforcement learning algorithm. The algorithm decides, at each time step, if a job should be submitted for execution, based on previous experience. In this context, previous experience is the outcome of previous job submissions together with the state information at the time when the jobs were submitted. A successful execution of a job reinforces the current policy, while a failure causes the policy to change.

Another embodiment of a method for estimating actual resources is using optimization techniques, for example, line search algorithms. These algorithms are best applied when repeated jobs can be identified because such identification limits the search to a given set of jobs, thus greatly simplifying the search. The main difference between most line search algorithms and the resource estimation problem is that in the former, the best parameter values are usually known to be in some area of the parameter space, e.g. between some minimum and maximum values. In parameter estimation, however, there is additional knowledge that the user provided in the form of requested resources, which are both the maximal value and the more likely value for the parameter.

The algorithm allocates the user-requested resources when a job is first run. In later submissions, the algorithm attempts to allocate lower resources, until the job cannot run successfully. The algorithm then attempts to reduce the resources by a lower factor, until it cannot continue any more. At this time, the estimation process terminates. The algorithm (run for each repeating job) is shown in detail below, where E denotes the estimated resource and R the resources requested by the user.

The following algorithm is a modified successive approximation algorithm, otherwise known as a line search algorithm. For simplicity, identification of a single parameter is described. However, extension of this algorithm for simultaneously estimating multiple parameters is straightforward using multidimensional optimization algorithms.

```
Initialize: E ← R; α > 1, 0 < β < 1
for each job repetition do
    submit job to scheduler using E as estimated resources
    if job terminated successfully then
        E ← E^α
    else
        E ← E^(1/α)
        α ← max(α^β, 1)
    end if
end for
```

The advantage of such an algorithm is that the effort to reduce resources is largest for the most frequently repeating jobs. Thus, the more common a job is, the more the algorithm will attempt to reduce its resource requirements. Running this algorithm for each instance of repeating jobs requires holding in memory just three parameters for each job identifier: the estimated resources, α, and β.

The estimation parameters, α, and β, can be initialized arbitrarily. In the signal-processing field the values of α=2, β=0 are commonly used. In the case of resource estimation it is advantageous to set these parameters according to the expected variance in the required resources of repeating jobs. Thus, when this variance is large, α should be set to a low value. However, if α is too low, the estimation process will require many more repetitions to reach a good approximation of the actual requirements. The setting of these parameters also impacts the gain attained by parameter estimation.

The algorithm, as shown above, is suitable for estimating one parameter. Generalization of this algorithm into higher dimensions (i.e. more parameters estimated) is straightforward using methods of multidimensional optimization.

Figure 5:
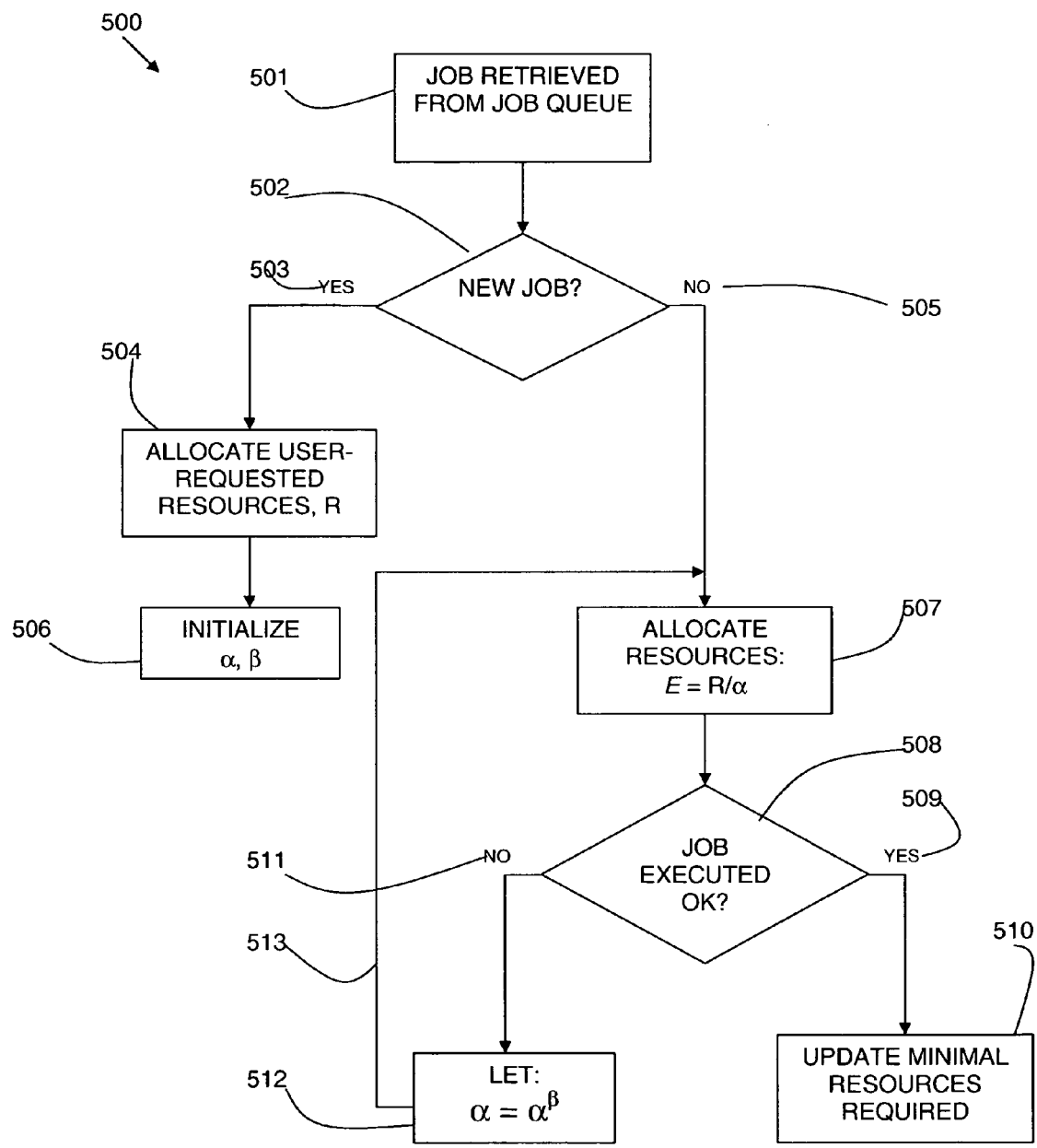
FIG. 5 is a flow diagram of an embodiment of an estimator process in accordance with the present invention.

FIG. 5 shows a flow diagram 500 of this modified successive approximation. A new job 501 is retrieved from the job queue by the scheduler and sent to the estimator. It is determined 502 if the job is a new job, i.e. whether it falls outside a predefined similarity measure compared to previously executed jobs. If the job is a new job 503, it is allocated the user-requested resources, R 504 and the estimation algorithm initializes the parameters α and β 506.

If the job is not a new job 505 as it falls within the predefined similarity measure compared to a previously executed job, the estimator allocates resources 507, E=R/α. It is then determined 508 if the job executed successfully. If the job is successful 509, the minimal resources required for jobs similar to this job is updated 510. If the job fails 511, let α=α^β 512 and the process loops 513 to retry a resource allocation 507, E=R/α.

Figure 6:
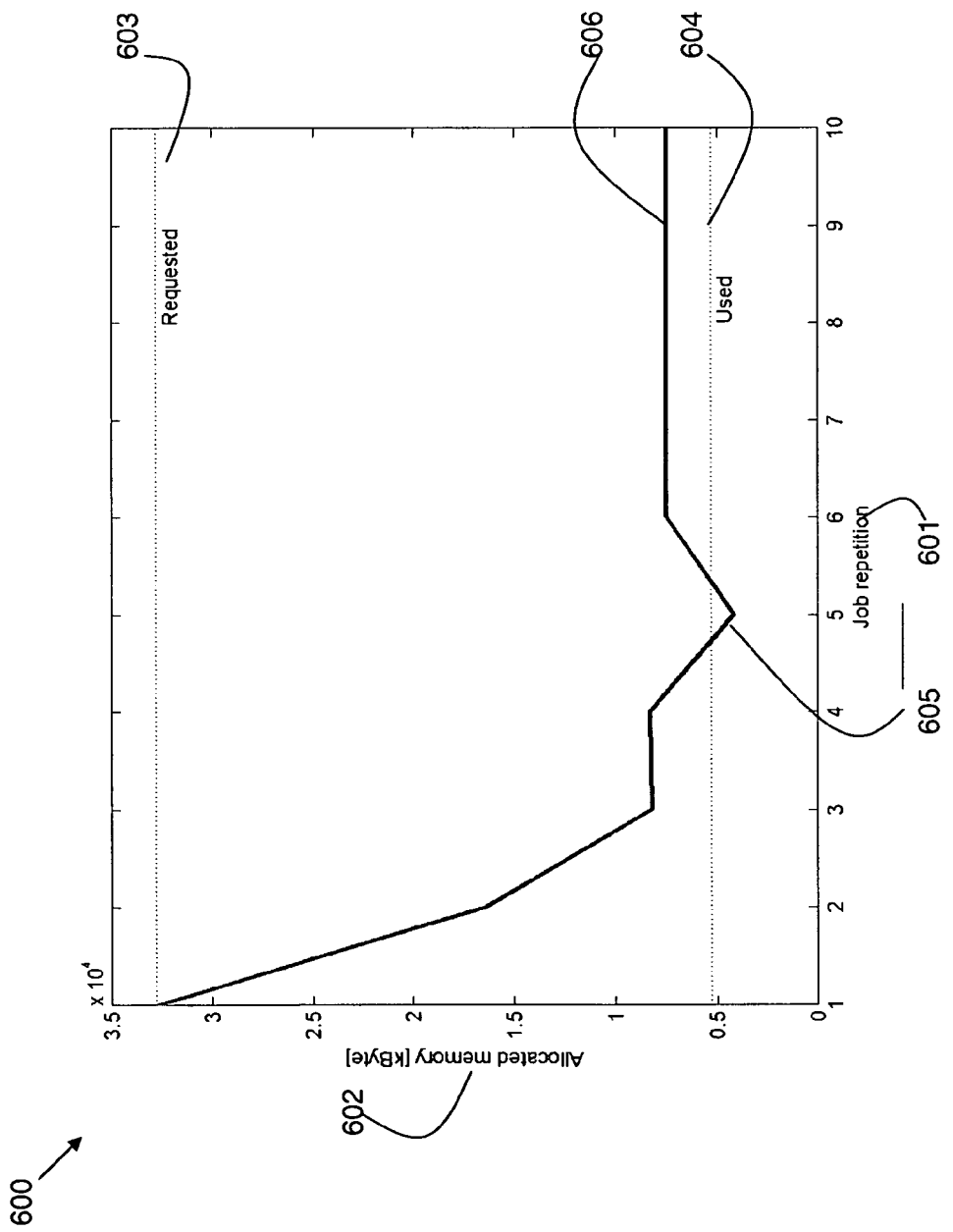
FIG. 6 is a graph showing a sample job behaviour using the system of the present invention.

The advance of the estimation process for a single job is shown in FIG. 6. FIG. 6 shows a graph 600 of the number of job repetitions 601 along the x-axis against the allocated memory 602 along the y-axis.

This figure shows a job whose requested memory was 32 Mb 603, although it only used slightly more than 5 Mb 604. The estimation algorithm is used and, as the graph shows, the estimated memory decreased by factors of two until it dropped below actual memory requirements 605. This caused the job to terminate abnormally, and thus the final estimated memory was 8 Mb 606. For this job, a four-fold reduction in memory resources was found.

The prior art systems dealt with job requirements as defined by the users rather than the actual runtime job requirements. Specifically, all known approaches allocate resources that are "greater than or equal to" users' requirements. In the described system, an approach is used which allocates resources which are "less than, equal to, or greater than" users' requirements, thus greatly reducing the under-utilization of resources caused by poor user estimates of job requirements.

An automatic, learning, job requirements estimator is described which assists the job scheduler to match computers with lower resources than those requested by jobs. These jobs have high probability of successful termination although they assign less resources (e.g. memory capacity) or even no resources (e.g. ignore some software defined as prerequisites), based on the previous experience of the scheduler. The system is useful in heterogeneous cluster environments in which utilization, slowdown, or any other measurement derived from them, are the primary goals.

The more varying are the job requirements and the resources capacities, and the more jobs that have repeated execution, the more important the system is for high-utilization of the resource groups.

A job requirements estimator alone or as part of a job scheduler may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method of resource allocation for execution of a job, the method comprising:
    collecting feedback regarding resource allocation and execution of previously submitted job requests to a clustered network, wherein resources of a plurality of computers are clustered together in form of one or more source nodes for the purpose of servicing submitted job requests;
    receiving a request for execution of a job including parameters associated with the job, wherein the parameters are provided by a user as an estimation of resources to be utilized to successfully execute the job;
    allocating one or more resources to the job according to the provided user estimate without regard to the collected feedback information, if the job is determined to be a job distinguishable from a previously submitted job in accordance with a measurable similarity threshold;
    otherwise, estimating the resources utilized for execution of the job based on the collected feedback and state of currently available resources in the clustered network such that the estimated resources are less than the provided user estimate or a previously calculated estimated associated with a previously submitted similar job, if the collected feedback indicates that the previously allocated resources to a previously submitted similar job were adequate to service the previously submitted similar job; and
    continuing the estimating process to calculate final estimated resources by successively reducing level of estimated resources to be utilized for execution of the submitted job, provided that the level of estimated resources does not fall below a lowest successful resource allocation level;
    allocating the job to one or more resource nodes that provide a final calculated estimated resources according to the estimating process.

2. A method as claimed in claim 1, wherein the feedback is implicit feedback indicating the success or failure of the execution of a job or explicit feedback indicating actual resources used by the job.

3. A method as claimed in claim 1, wherein the one or more resource nodes allocated for execution of a job have less than a user requested resource allocation for the job.

4. A method as claimed in claim 1, wherein the allocation process for allocating the job to one or more resource nodes is performed by way of a reinforcement learning scheme which is based on a reward and penalty application depending on success rate of an allocation.

5. A method as claimed in claim 1, wherein a job is similar to a previously submitted job by comparing by one or more of: user identifier, application number, requested memory, or other relevant parameter in the corresponding job request.

6. A method as claimed in claim 1, wherein reducing level of estimated resources includes reducing the resource allocation by a predetermined factor.

7. A method as claimed in claim 1, wherein an optimization algorithm such as a line search algorithm is used limited to a set of repeating jobs with a maximum parameter of the user requested resource allocation.

8. A system for resource allocation for execution of a job, the system comprising:
    at least one processor;
    a feedback mechanism for collecting feedback regarding resource allocation and data about execution of previously submitted job requests to a clustered network, wherein resources of a plurality of computers are clustered together in form of one or more source nodes for the purpose of servicing submitted job requests;
    a job scheduler for receiving a request for executing a job including parameters associated with the job, wherein the parameters are provided by a user as an estimation of resources to be utilized to successfully execute the job;
    a resource allocator for allocating one or more resources to the job according to the provided user estimate without regard to the collected feedback information, if the job is determined to be a job distinguishable from a previously submitted job in accordance with a measurable similarity threshold;
    an estimator for estimating the resources utilized for execution of the job based on the collected feedback and state of currently available resources in the clustered network such that the estimated resources are less than the provided user estimate or a previously calculated estimated associated with a previously submitted similar job, if the collected feedback indicates that the previously allocated resources to a previously submitted similar job were adequate to service the previously submitted similar job; and
    continuing the estimating process to calculate final estimated resources by successively reducing level of estimated resources to be utilized for execution of the submitted job, provided that the level of estimated resources does not fall below a lowest successful resource allocation level;
    wherein the resource allocator allocates the job to one or more resource nodes that provide a final calculated estimated resources according to the estimating process.

9. A system as claimed in claim 8, wherein the feedback is implicit feedback indicating the success or failure of the execution of a job or explicit feedback indicating actual resources used by the job.

10. A system as claimed in claim 8, wherein the one or more resource nodes allocated for execution of a job have less than a user requested resource allocation for the job.

11. A system as claimed in claim 8, wherein the allocation process for allocating the job to one or more resource nodes is performed by way of a reinforcement learning scheme which is based on a reward and penalty application depending on success rate of an allocation.

12. A system as claimed in claim 8, wherein a job is similar to a previously submitted job by comparing by one or more of: user identifier, application number, requested memory, or other relevant parameter in the corresponding job request file.

13. A system as claimed in claim 8, wherein reducing level of estimated resources includes reducing the resource allocation by a predetermined factor.

14. A system as claimed in claim 8, wherein an optimization algorithm such as a line search algorithm is used limited to a set of repeating jobs with a maximum parameter of the user requested resource allocation.

15. A method of resource allocation for execution of a job, the method comprising:

collecting feedback regarding success data about execution of previously submitted job requests to a clustered network, wherein resources of a plurality of computers are clustered together in form of one or more source nodes for the purpose of servicing submitted job requests;

receiving a request for executing a job including parameters associated with the job, wherein the parameters are provided by a user as an estimation of resources to be utilized to successfully execute the job;

allocating one or more resources to the job according to the provided user estimate without regard to the collected feedback information, if the job is determined to be a job distinguishable from a previously submitted job in accordance with a measurable similarity threshold;

otherwise, estimating the resources utilized for execution of the job based on the collected feedback and state of currently available resources in the clustered network such that:

(1) the estimated resources are larger than the provided user estimate or a previously calculated estimate associated with a previously submitted similar job, if the collected feedback indicates that the previously allocated resources to the previously submitted similar job were inadequate to service the previously submitted similar job, and (2) the estimated resources are less than the provided user estimate or a previously calculated estimated associated with a previously submitted similar job, if the collected feedback indicates that the previously allocated resources to a previously submitted similar job were adequate to service the previously submitted similar job; and continuing to successively update level of estimated resources according to the above conditions until the estimated resources are adequate to service the request below an upper limit threshold, or the estimated resources are not below a lowest successful resource allocation level; and allocating the job to one or more resource nodes having the estimated resources according to the estimating process.

* * * * *